Jan. 20, 1959 W. J. KINDERMAN ET AL 2,869,371
COMPENSATING MECHANISM FOR INDICATOR
Filed June 6, 1955 4 Sheets-Sheet 1

INVENTOR
Walter J. Kinderman
James W. Williams, 3rd
BY
ATTORNEYS.

Jan. 20, 1959  W. J. KINDERMAN ET AL  2,869,371
COMPENSATING MECHANISM FOR INDICATOR
Filed June 6, 1955  4 Sheets-Sheet 2
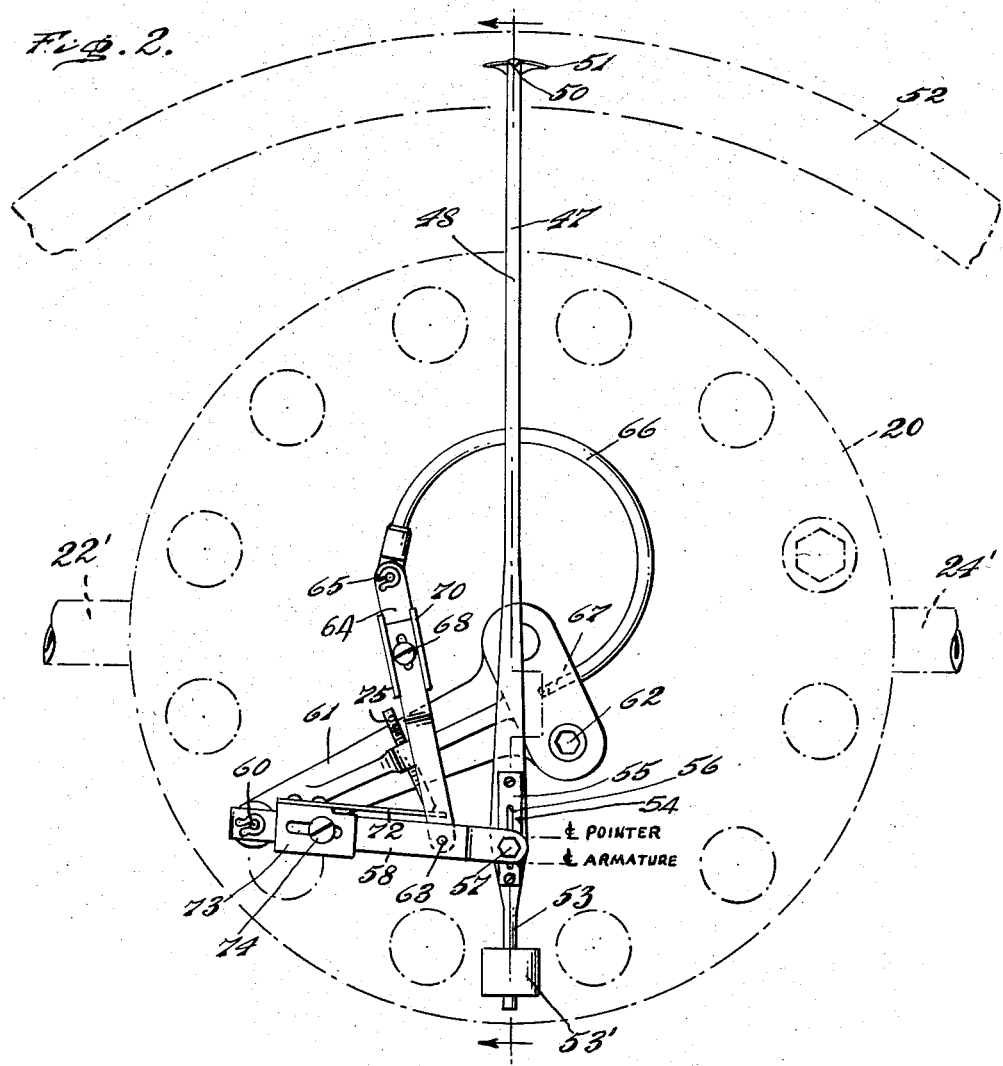
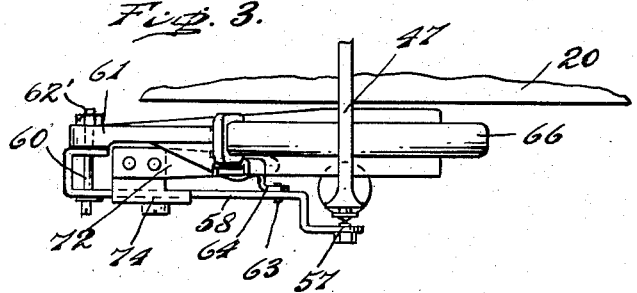
INVENTOR
Walter J. Kinderman
James W. Williams, 3rd.
BY
ATTORNEYS

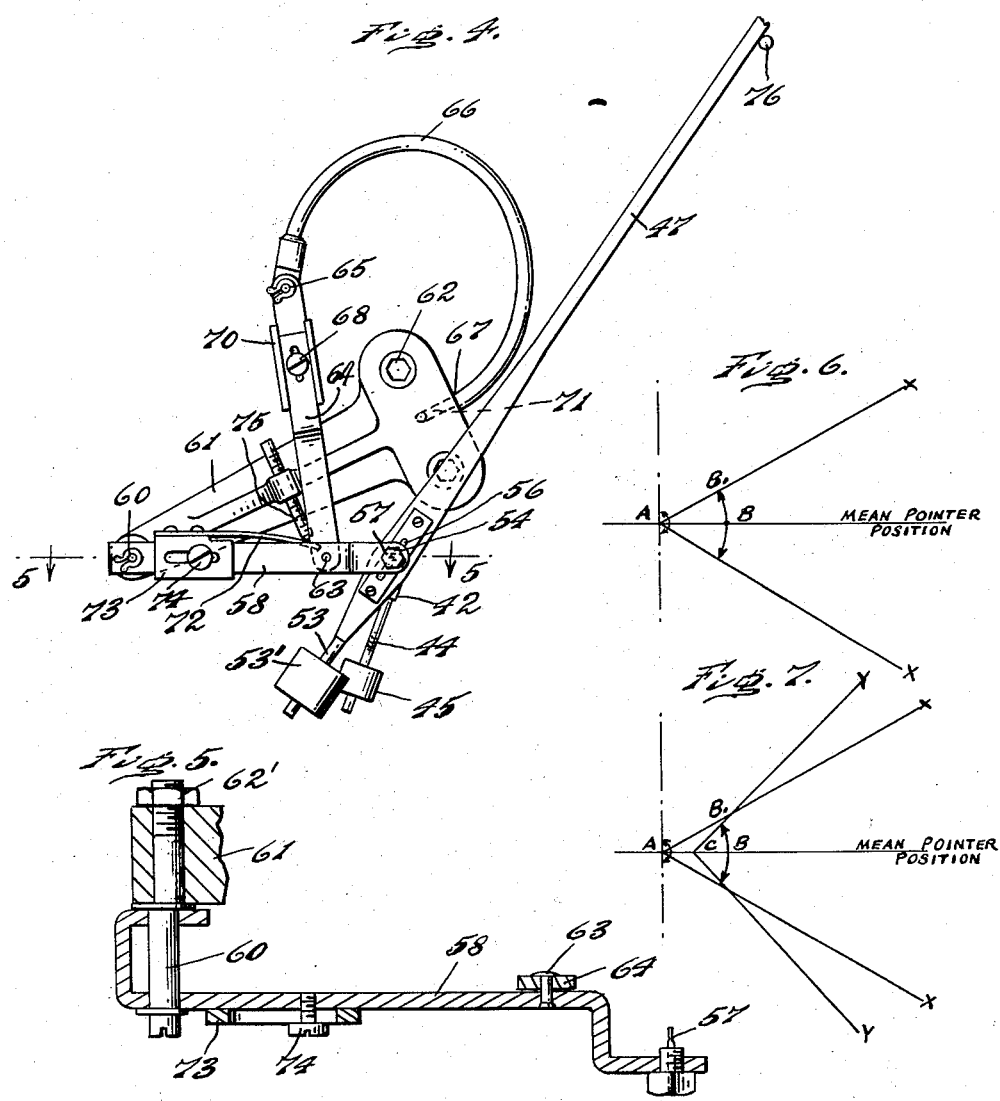

Jan. 20, 1959 W. J. KINDERMAN ET AL 2,869,371
COMPENSATING MECHANISM FOR INDICATOR
Filed June 6, 1955 4 Sheets-Sheet 4
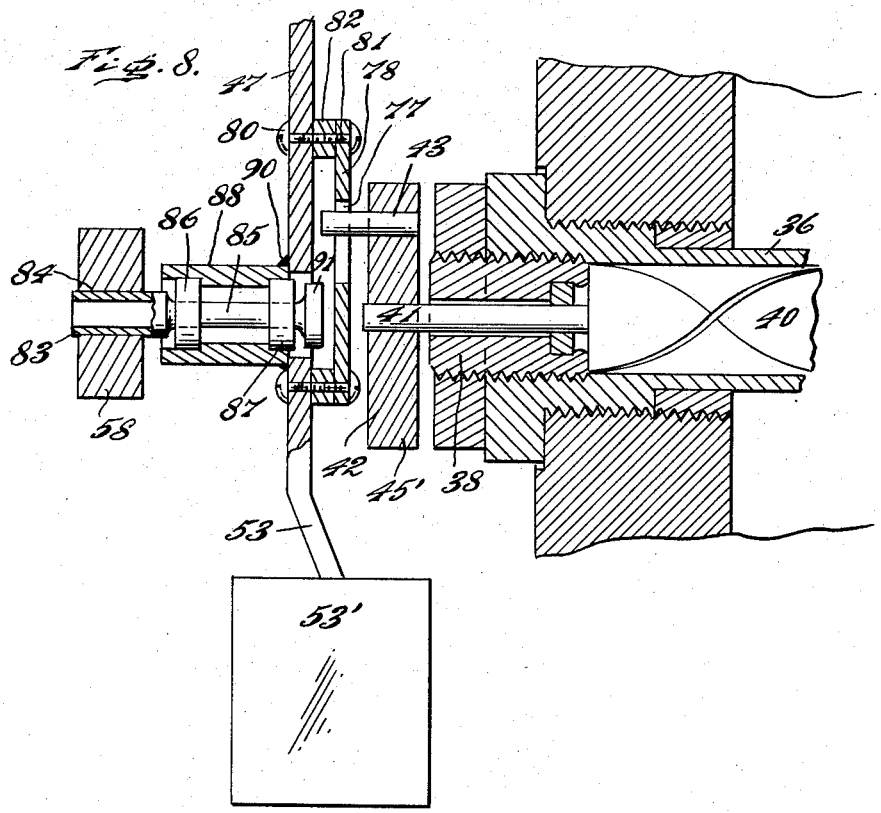
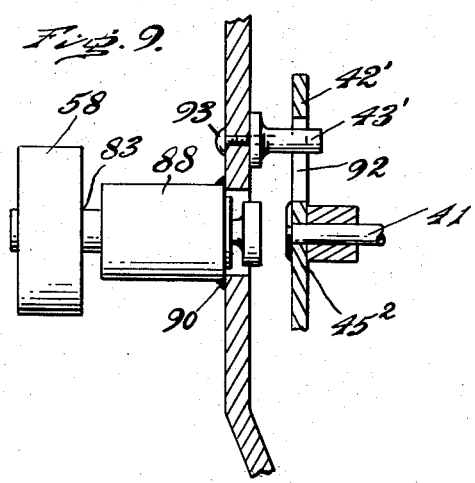
INVENTOR
Walter J. Kinderman
James W. Williams, 3rd.
BY
ATTORNEYS United States Patent Office 2,869,371
Patented Jan. 20, 1959

2,869,371

COMPENSATING MECHANISM FOR INDICATOR

Walter J. Kinderman, Philadelphia, and James W. Williams, 3rd, Lansdale, Pa., assignors to Yarnall-Waring Company, Philadelphia, Pa., a corporation of Pennsylvania Application June 6, 1955, Serial No. 513,281

7 Claims. (Cl. 73—432)

The present invention relates to compensating an indicator for an independent variable, for example compensating a pressure responsive liquid level indicator for variation in density of boiler water with change in boiler pressure. The invention is applicable for any other suitable character of compensation of a primary indicator.

The present application is a continuation-in-part of our copending application Serial No. 466,716, filed November 4, 1954, for Compensation Mechanism, now abandoned.

A purpose of the invention is to provide a compensation which is external and which does not require changing the internal construction of the indicator.

A further purpose is to compensate from the mean pointer position so that any error is divided between the range above and the range below the mean position. Thus only half the accumulated error will obtain by reference from either extremity of the range.

A further purpose is to balance the primary indicator shaft and compensate with practically no loading imparted to the primary indicator shaft.

A further purpose is to separate the forces which produce movement of the primary indicator shaft and forces which produce movement of the compensating system so as to avoid the need for complicated linkages and adjustments.

A further purpose is to produce a compensating system whose response is easy to check and therefore more reliable than in the case where internal compensation is used.

A further purpose is to operate the compensation in any suitable manner, as in response to pressure or temperature, or by a servo mechanism or with a weighing beam system.

A further purpose is to avoid interference by the compensation with the normal adjustment of the range of the indicator.

A further purpose is to indicate where desired both the compensated and uncompensated readings for comparison.

A further purpose is to use a direct linkage which is free from trouble and can be made with liberal tolerances, using adjustments for close positioning in the null position.

A further purpose is to use the pointer compensation alternatively either to add to the movement of the pointer or subtract from the movement of the pointer by placing the compensator pivot pin on the proper side of the instrument shaft.

A further purpose is to use only a single adjustment to alter the range of compensation to meet a new set of conditions.

A further purpose is to follow the pressure-density curve of water closely and properly compensate for density changes over the entire boiler pressure range to produce drum water level indication.

A further purpose is to adjust the system to meet other compensation requirements to duplicate water level gauge glass readings.

Further purposes appear in the specification and in the claims.

In the drawings we have chosen to illustrate a few only of the numerous embodiments in which our invention may appear, selecting the forms shown from the standpoints of convenience in illustration, satisfactory operation and clear demonstration of the principles involved.

Figure 2 is a front elevation of the compensating mechanism of the present invention, showing the indicator itself in phantom.

Figure 3 is a fragmentary top plan view of the mechanism of Figure 2, shown in a compensated position.

Figure 4 is a fragmentary view corresponding to Figure 2, and showing the compensating mechanism in an extreme position.

Figure 5 is a fragmentary enlarged section on the line 5—5 of Figure 4.

Figures 6 and 7 are diagrams useful in explaining the invention, and illustrating a modification.

Figures 8 and 9 are partially diagrammatic axial sections showing variations in the invention.

Figure 1:
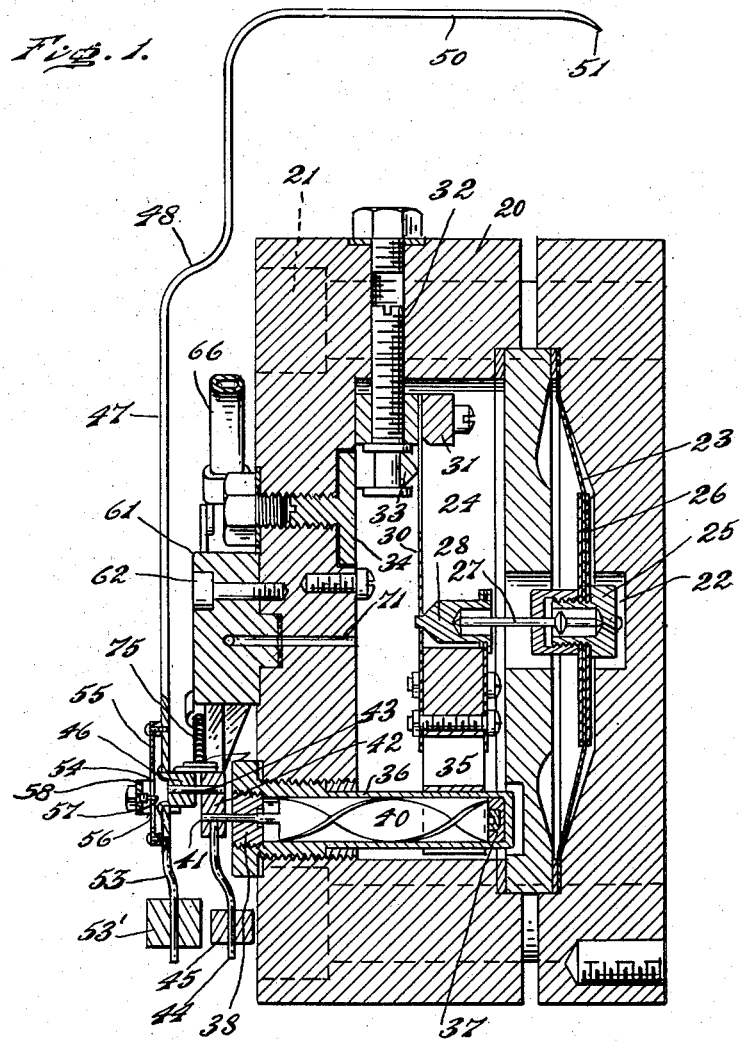
Figure 1 is an axial section of an indicator embodying the principles of the invention.

Describing in illustration but not in limitation and referring to the drawings:

Kinderman U. S. Patent 2,509,644, for Differential Pressure Gauge, incorporated herein by reference, illustrates a gauge which for example indicates liquid level in terms of pressure. The present invention is concerned with the compensation of an indicator of this character, or of any other suitable type, for change in a variable other than the variable primarily indicated. For example, in a liquid level indicator which responds to pressure, variation in density of boiler water with change in boiler pressure may give rise to error, and the device of the present invention compensates for such variation in density. The device of the invention has a number of advantages which are peculiar to it, and which permit useful application of the invention to correction of any suitable variable other than the primary variable.

The device of the invention is in essence a multiplying mechanism driven preferably by a Bourdon tube element which introduces an algebraic factor, preferably a plus factor, to the compensated pointer to cause additional travel as compared to the movement of a standard pointer in response to the same differential head (in the case of a liquid level gauge). The magnitude of the factor introduced depends upon the pressure and closely follows the pressure density curve.

The fundamental principle of the invention will be understood by reference to Figures 6 and 7. In Figure 6 the point A is the axis of the primary indicator shaft about which it rotates. When an arbitrary point B on the pointer arm is located at a suitably moderate distance from A (for example $\frac{9}{16}$ of an inch) and the primary indicator shaft is rotated, the point B will move in a circular path as indicated. At the mean pointer position shown, the point will be at B and in some other position it will be at $B_1$ along the pointer line AX. If a third point C is placed on the mean pointer line (Figure 7) between points A and B and a compensated pointer is added to the system free to pivot on the first pointer at $B_1$ and engaging the point C, the standard pointer will lie along AX and the compensated pointer will lie along CY. The position of the standard pointer will depend on the distance CB. As C leaves A and approaches B the angular difference between the positions of line AX and line CY will increase. If the point B swings below the mean pointer position the multiplication of the pointer movement will be in the down scale of direction, as shown.

Thus reviewing this system geometrically, we may say that a mean pointer position line extends through the primary indicator axis A and two lines are provided crossing the mean pointer position, one passing through the primary indicator axis and the lines intersecting a common point toward the outer extremity. The corresponding angles subtended are proportional to the mean pointer line distances from the two intersections to the edge of the circular arc.

This system may be made with two pointers as described, or it may be simplified by replacing the primary indicator pointer with a crank arm and carrying a crank pin on the crank arm on which the pointer is pivoted. In one form, a sliding pivot having preferably a range corresponding to the distance between the points A and B is secured to the pointer. The crank arm and the pointer are balanced independently each about its center of rotation, so that neither will exert a substantial reaction on the other.

Figures 1 to 5 illustrate a convenient embodiment of this mechanism.

As illustrated in Figure 1, the primary indicator housing 20 suitably held together by bolts 21 has a differential pressure space 22 on one side of an internal pressure responsive diaphragm 23 and a differential pressure space 24 on the other side of the diaphragm. The respective differential pressure spaces are suitably connected as by pipes 22′ and 24′ as explained in the Kinderman patent to respective upper and lower positions in a water column in the case of a liquid level gauge assembly.

The diaphragm 23 has an opening at the center which is closed by a thimble 25 clamping diaphragm plates 26 on opposite sides of the diaphragm so as to confine flexing of the diaphragm to the outer edges. The thimble retains a pressure rod 27 which responds to the diaphragm position and is continuously held in contact in a socket 28 mounted on a leaf spring 30 which is secured at 31 to the housing. An adjustment screw 32 advances an adjustment contact element 33 along the leaf spring to adjust its fulcrum, and the fulcrum is moved transversely to the plane of the spring by an adjustment screw 34 as well known in the art.

The leaf spring mounts a magnet 35 having spaced poles which straddle a non-magnetic well 36 which extends in from the outside of the housing and therefore is not subjected to the pressure of either of the differential pressure spaces in the housing.

The well at its base mounts a bearing 37 and at its outer end mounts a second bearing 38 and the bearings journal a magnetically susceptible spiral armature 40, as well known in the art, which is suitably integral with a primary indicator shaft 41.

The mechanism just described, all well known in the art, can be replaced by some other type of primary indicator.

On the outer end the primary indicator shaft 41 mounts a crank arm 42, best seen in Figure 1, which at its outer end carries a crank pin 43. The crank arm has a counterweight extension 44 opposite to the direction of the crank arm which carries a counterweight 45 which is adjustable thereon.

The crank pin 43 is surrounded by a bearing 46 which mounts pointer 47. This is shown in simplified form but may suitably be a jewelled bearing. The pointer may be of any desired contour suitably having a set-back portion 48 and a right angle bend portion 50 carrying an arrow 51 which extends across a suitable scale 52. Opposite to the direction of the pointer a counterweight arm 53 is provided on the pointer mounting an adjustable counterweight 53′. Counterweighting of the pointer and of the crank and attached system are wholly independent.

The pointer desirably over the range between the primary indicator shaft axis and the crank axis has a sliding bearing 54 which is conveniently formed by a suitable metallic strip 55 secured to the pointer and spaced therefrom and having an elongated slot 56 in the direction of the length of the pointer which is slidably engaged by a sliding pivot pin 57 on the end of a compensating arm 58 which is pivoted at 60 on a bracket 61 bolted to the housing at 62. The pivot 60 is desirably mounted eccentrically on a screw post 62′ and by turning the screw the axis position can be varied at the time of assembly.

Intermediate between its ends and preferably near to the sliding pivot, the compensating arm is pivotally connected at 63 with a link 64 which at its opposite end pivotally connects at 65 to the outer end of a Bourdon tube element 66 which is mounted at 67 in the bracket 61. The link consists of two parts which are joined by a screw and slot connection 68 and which are held in guiding relation by ears 70 so that the length of the link is subject to adjustment at the time of assembly.

The Bourdon tube element is of course hollow and connects through a passage 71 on the interior of the bracket extending through the housing to the differential pressure space 24.

The compensating device is desirably spring loaded and biased so that spring pressure is built up as adjustment takes place in Figure 4, by providing a leaf spring 72 mounted on a bracket 73 which is held by a screw and slot connection 74 adjustable along the compensating arm. The deflectable end of the leaf spring is engaged by an abutment screw 75 extending out from the bracket and desirably engaging the spring at the minimum deflected position, and over the entire range.

The pointer movement may be limited by stops 76 (only one is shown).

In operation, it will be evident that in the mean scale position as indicated approximately in Figure 2, the compensating arm 58 extends approximately normal to the pointer and pivots about a remote pivot. The pivot pin in this position engages in the slot and the lever is positioned by the Bourdon tube which is sensitive to the pressure changes to be compensated for. Instead of the Bourdon tube, a thermostatic element sensitive to a corresponding temperature transmitted from the sensing location may be used. The amount of compensation for a given movement of the crank arm depends upon the ratio of the constant lever (that is the distance between the primary indicator axis and the crank axis) to the variable lever (that is the distance from the crank pin to the sliding pivot pin).

The system in effect is a crank arm mounted on the primary indicator shaft, the arm having a crank pin remote from the shaft center with an indicating pointer mounted and pivoted on the crank pin and a compensating pin mounted on a remotely pivoted arm which is normal to the mean pointer position engaging a slot on the pointer arm to provide a variable radius of rotation about the pin in the slot and increase the range of pointer movement with movement of the compensator pin toward the crank pointer pivot.

In accordance with the invention, the multiplied movement of the pointer arm in accordance with the variable point of pointer arm rotation is closely proportional to the angular armature movement. The change in angular movement of the pointer arm is in approximate relation to the movement of the rotation center from the center of armature rotation toward the center of pointer rotation. There is a slight error due to the difference in the arc of the crank arm and the corresponding arc subtended by the variable center of the pointer arm rotation, but this is equally divided from the mean position of the pointer. In practical application, the variation from straight proportionality over approximately 45° of angle of pointer travel from the mean position is not appreciable and can be disregarded.

The very desirable aspect of the invention is that the degree of compensation can be adjusted to fit the particular requirements. The deflection of the primary element due to a change in the variable may produce a curve whose slope does not match the required variable-deflection curve. This may be corrected by linkages if desired. The device above described superimposes the curve of a leaf spring upon that of the actuating element, the Bourdon tube.

This provides a method of obtaining a variable ratio of response corresponding to the change in basic operating factors by applying restraint to the primary element. This restraint is in opposition to response of the pressure sensitive element and serves to reduce the travel in direct proportion and is adjusted so that the restraint starts from zero at the null position of the sensitive element. The restraint reaction with movement of the primary element determines the remaining differential for compensation.

The adjustment screw abutment 75 provides a means of aligning the null position of the spring with the saturation pressure-density curve. The variable spring rate superimposed on the spring rate of the Bourdon tube provides adjustment for conditions other than drum level. Any suitable material for the spring 72 may be used, but beryllium copper has proved to be a very desirable material. In order to provide agreement with the boiler gauge glass, the slide adjustment 74 is made to decrease the amount of compensation. Gauge glasses which are relatively close to saturation temperature will require slight movement of the slider while cooler gauges will require use of a greater amount of adjustment.

The jewelled bearing in the hub of the compensated pointer and suitable bearing properties on the sliding pivot pin, obtained for example by chrome plating, reduce friction and insure against wear.

In the form of Figures 1 to 7, inclusive, the moment arm between the primary indicator axis and the crank axis is fixed in length, while the moment arm between the crank axis and the interconnecting pivot axis of the compensating arm is variable. In some cases it is preferable to keep the moment arm on the pivot variable but to vary it by adjusting the crank pivot rather than the compensating arm pivot, while in other cases it is preferable to vary the moment arm on the primary indicator and keep the moment arm on the pointer constant. In any case the adjustment is desirably accomplished in the plane of the scale midpoint in response to the correcting variable as previously described. The correcting variable displaces one of the axes with respect to one of the other two.

In the form of Figure 8, the primary indicator shaft 41 mounts a crank arm 42 which mounts a crank pin 43 as already described. The pointer 47, instead of being fixedly pivoted to the crank pin 43, is adjustably pivoted as by a pivot slot 77 extending longitudinally of the pointer in a pivot strip 78 mounted by screws 80 and 81 engaging spacer nuts 82.

The primary indicator system is counterweighted by a counterweight 45', desirably integral with the crank arm 42 as shown.

The compensating arm 58 in this case has a fixed pivot to the pointer, provided by a pivot stem 83 which suitably makes a forced fit into a hole 84 near the end of the compensating arm, the pivot stem having a reduced bearing portion 85 which journals in jewelled bearings 86 and 87 pressed into a housing 88 which is secured as by brazing at 90 to the pointer. The stem has an enlarged end 91 which prevents unintentional separation of the bearing.

It will be evident that in the form of Figure 8 the adjustment is the adjustment of the distance from the compensating arm pivot axis to the crank axis, the adjustment being over a range such that the compensating arm pivot axis lies between the crank axis and the primary indicator shaft axis. The compensating arm is suitably moved by the Bourdon tube and link arrangement shown in Figures 1, 2, 3 and 4.

In some cases it is preferred to vary the moment arm which is on the primary indicator system and this is illustrated in Figure 9.

In this form the crank arm 42' has a counterweight portion $45^2$ (broken away) and has at the crank position a longitudinally extending slit 92 which receives crank pin 43' which in this case is mounted on the pointer at 93. The bearing construction between the compensating arm and the pointer is the same as that shown in Figure 8 so that when the Bourdon tube and link move the compensating arm, in this case the crank axis is moved closer to the primary indicator shaft axis.

It will be evident that in all of these forms the primary indicator shaft axis, the crank axis and the compensating pivot axis are parallel to one another and during the operating range the compensating pivot axis lies between the primary indicator shaft axis and the crank axis.

While the various views show pin and slot types of sliding pivots, it will be understood that any other type of sliding pivot can be used.

In the form of Figures 1 to 7, the weight of the pointer is carried by the primary indicator and the compensating system fixes the point of rotation of the follower either with respect to the primary indicator system or with respect to the compensating arm. In the alternate forms of Figures 8 and 9, the weight of the pointer is carried by the compensating system and the pointer is balanced about the crank axis. This has the advantage in some cases of relieving the primary indicator system of the weight of the pointer, which may be important, especially where shock or vibration are to be encountered.

While the device as specifically shown compensates for density changes, the principles of the invention are more broadly applicable. By shifting the movement of the compensator pin to a path directly away from the arc described by the crank arm the system will subtract from the standard pointer movement by a factor equal to the ratio of the mean pointer line distances from the circular arc. The adjustments of the compensator will then add to the compensation.

It will be evident that once the device is set up and the adjustments are made, the Bourdon tube by deflecting will automatically determine the required compensation of the pointer to correct the pointer for differences in density of the boiler water due to differences in pressure.

In view of our invention and disclosure variations and modifications to meet individual whim or particular need will doubtless become evident to others skilled in the art, to obtain all or part of the benefits of our invention, without copying the structure and method shown, and we therefore claim all such insofar as they fall within the reasonable spirit and scope of our claims.

Having thus described our invention what we claim as new and desire to secure by Letters Patent is:

1. In an indicator, a rotatable primary indicator shaft turning on the shaft axis responsive to a primary variable, a crank arm mounted on the primary indicator shaft and turning in an arc about the shaft axis, a pointer pivoted to the crank arm and turning on a crank pin pivot having an axis parallel to the shaft axis, the pointer turning with turning of the primary indicator shaft, a compensating element pivoted to the pointer on a pivot axis parallel to the shaft axis, and means for adjusting the relative position of one of the shaft axes, the crank pin axis and the pivot axis to one of the others in response to an independent variable, the pivot axis lying between the shaft axis and the crank pin axis throughout the range of adjustment.

2. An indicator according to claim 1, in which said compensating element comprises an arm pivotally mounted at the end remote from the pivot axis, a Bourdon tube responsive to pressure to which a fluid is subjected, and means operatively interconnecting the Bourdon tube with the compensating arm.

3. An indicator according to claim 1, in which said compensating element comprises an arm pivotally mounted at the end remote from the pivot axis, and extending transverse to the pointer at mean position of the pointer, a Bourdon tube responsive to pressure to which a fluid is subjected and a link operatively interconnecting the Bourdon tube with the compensating arm between the pivot axis and the pivot mounting of the compensating arm.

4. An indicator according to claim 1, in which the compensating element comprises an arm pivotally mounted at the end remote from the pivot axis, and spring means biasing the arm toward one limiting position.

5. An indicator according to claim 4, in which said means comprises a Bourdon tube responsive to variation in pressure to which a liquid is subjected, and means operatively connecting the Bourdon tube with the compensating arm between the pivot axis and the pivot mounting of the compensating arm for manipulating the compensating arm against the spring bias.

6. An indicator according to claim 1, in combination with counterweight means for the crank arm system and separate counterweight means for the pointer.

7. In an indicator, a rotatable primary indicator shaft turning on the shaft axis responsive to a primary variable, a crank arm mounted on the primary indicator shaft and turning in an arc about the shaft axis, a pointer pivoted on the crank arm and turning about a crank pin axis parallel to the shaft axis and remote from the shaft axis, the pointer turning with turning of the primary indicator shaft, a compensating element pivoted to the pointer at a pivot axis parallel to the shaft axis and located on the end of the pointer adjoining the shaft axis at a distance from the shaft axis less than the distance to the crank axis and located at an intermediate position between extremes of pointer and crank arm movement, and means for adjusting the relative position of one of the shaft axes, the crank axis and the pivot axis to one of the others in response to an independent variable.

References Cited in the file of this patent

UNITED STATES PATENTS 2,632,421   Perkins _____ Mar. 24, 1953

FOREIGN PATENTS 231,414   Germany _____ Feb. 21, 1911
592,923   France _____ May 11, 1925